United States Patent
Ochi et al.

(10) Patent No.: US 8,012,569 B2
(45) Date of Patent: *Sep. 6, 2011

(54) SLIDING MEMBER AND PROCESS FOR FORMATION OF ITS COATING LAYER

(75) Inventors: Shinji Ochi, Inuyama (JP); Masahito Fujita, Inuyama (JP); Takuya Tanaka, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 1188 days.

This patent is subject to a terminal disclaimer.

(21) Appl. No.: 11/729,854

(22) Filed: Mar. 30, 2007

(65) Prior Publication Data

US 2007/0231564 A1    Oct. 4, 2007

(30) Foreign Application Priority Data

Mar. 30, 2006    (JP) ................. 2006-095110

(51) Int. Cl.
| | |
|---|---|
| *B32B 1/00* | (2006.01) |
| *B32B 3/00* | (2006.01) |
| *B32B 5/16* | (2006.01) |
| *F16C 19/00* | (2006.01) |
| *C01G 39/06* | (2006.01) |
| *C10M 169/04* | (2006.01) |
| *C10M 111/04* | (2006.01) |

(52) U.S. Cl. ........ 428/174; 428/156; 428/323; 428/328; 384/322; 384/462; 384/463; 384/907; 384/910; 508/113; 508/155; 508/167

(58) Field of Classification Search .................. None
See application file for complete search history.

(56) References Cited

U.S. PATENT DOCUMENTS

| 6,815,400 | B2 * | 11/2004 | Jee et al. .................. 508/113 |
| 7,399,122 | B2 * | 7/2008 | Fujita et al. ................ 384/276 |
| 2007/0016936 | A1 * | 1/2007 | Okada et al. ................ 725/136 |

FOREIGN PATENT DOCUMENTS

| JP | 11-131257 | 5/1999 |
| JP | 2002-339083 | 11/2002 |

* cited by examiner

*Primary Examiner* — Sheeba Ahmed

(74) *Attorney, Agent, or Firm* — Browdy and Neimark, PLLC

(57) ABSTRACT

An object of the present invention is that in a sliding member whose substrate is improved in sliding characteristics by a coating layer comprising a solid lubricant, the coating layer is obtained as one having a low coefficient of friction and an excellent wear resistance. In the present invention, the coating layer 7 has a structure formed by laminating solid lubricant plate crystal grains 3, and contains not more than 10 mass % of a resin for binder 8 for bonding the solid lubricant plate crystal grains 3, and the lubricant plate crystal grains have a crystal structure formed by piling (00l) planes (wherein l is an integer of not less than 1) in parallel, the index of orientation of the (00l) planes being not less than 90% at least on the sliding surface.

6 Claims, 7 Drawing Sheets

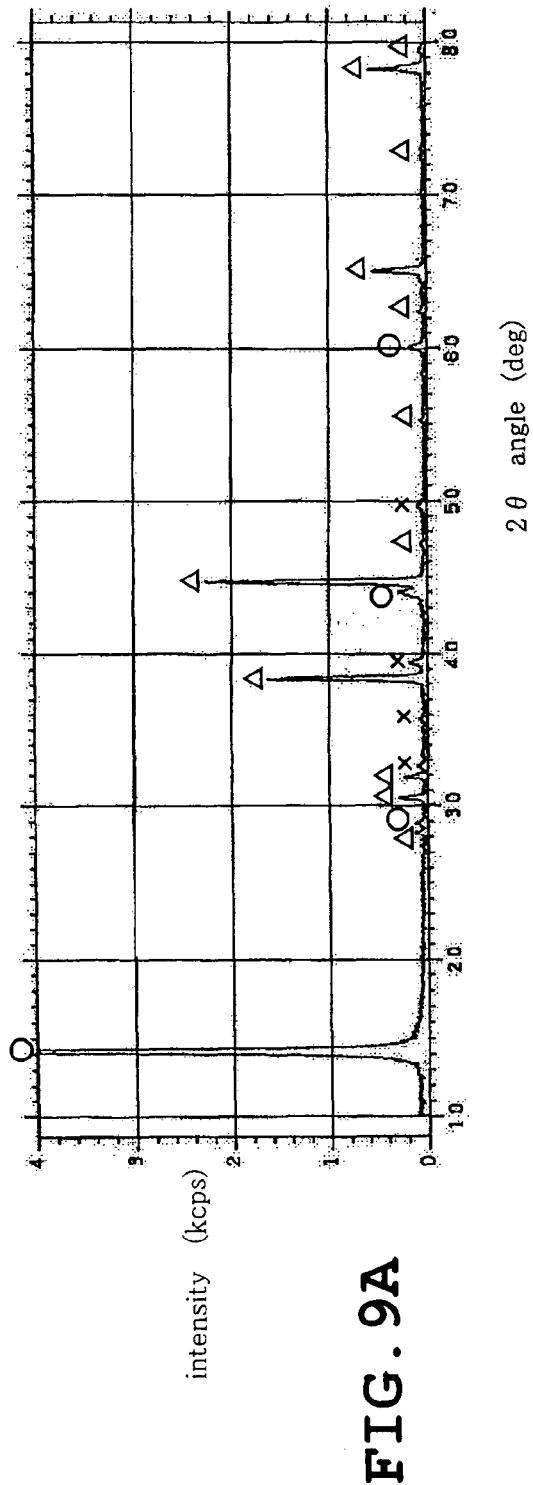
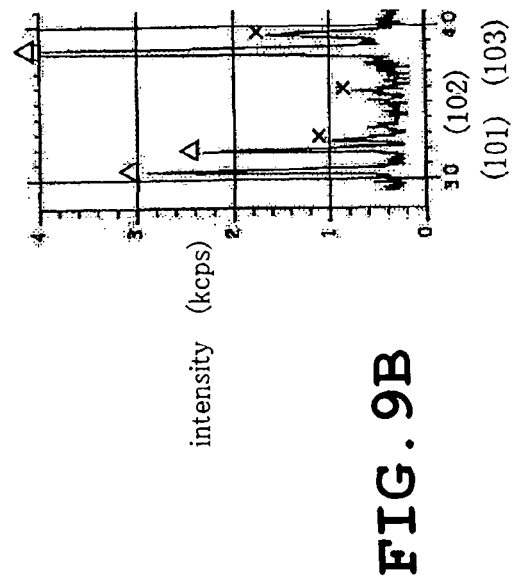
FIG. 9A
FIG. 9B

SLIDING MEMBER AND PROCESS FOR FORMATION OF ITS COATING LAYER

BACKGROUND OF THE INVENTION

The present invention relates to a sliding member comprising a substrate and a coating layer of solid lubricant plate crystal grains adhered to the surface of the substrate and a process for forming the coating layer.

In the plain bearings (sliding members) of engines for automobile, aluminum-based bearing alloys and copper-based bearing alloys are generally used as a sliding layer. In recent years, the engines for automobiles have been increased in engine power and engine speed but have been strongly required to be improved in fuel consumption rate. Therefore, the plain bearings are required to have low frictional properties. Particularly in the case of automobiles in which the start and stop of the engine are often repeated, such as hybrid cars, low frictional properties at boundary lubrication are demanded.

In satisfying the demand for the low frictional properties at boundary lubrication, it is effective to modify the surface of the plain bearing by forming a coating layer of a solid lubricant. For the modification of the bearing surface by the use of the solid lubricant, there are known techniques in which solid lubricant grains are allowed to collide with the plain bearing surface by application of a shot peening or shot blasting technique to be adhered to the bearing surface by the energy of collision (see, for example, patent documents 1 and 2).

Patent document 1: JP-A-11-131257
Patent document 2: JP-A-2002-339083

The above-mentioned patent document 1 discloses that zinc lubricant powder having an average grain size of 100 μm is allowed to collide with a substrate by the use of a blasting apparatus to be diffused and infiltrated into the inside of the substrate. The patent document 2 discloses that a coating layer is formed by allowing molybdenum disulfide with an average grain size of 1 to 20 μm and a purity of not less than 95% to collide with the piston, cylinder bore or the like of an engine at a projection speed of not less than 100 m/s and that an excellent reducing effect on the coefficient of friction can be obtained owing to the coating layer.

However, when solid lubricant grains are allowed to collide with the surface of a substrate to form a coating layer of the solid lubricant, the coating layer can be formed as a layer rich in the solid lubricant grains but the substrate surface is work-hardened by the collision of the solid lubricant grains, so that the conformability is deteriorated, resulting in a deteriorated anti-seizure property. In addition, when solid lubricant grains are allowed to collide with a substrate, a film is formed by the diffusion of the solid lubricant grains into the substrate or by the infiltration of the solid lubricant grains into the substrate by the force of impact and their adhesion to the substrate. Therefore, only a very thin coating layer can be formed and it is early worn away.

The present invention was made in view of the above situation. A first object of the present invention is to provide a sliding member having a low coefficient of friction and an excellent wear resistance. A second object of the present invention is to provide a process for forming the coating layer of a sliding member which makes it possible to form the coating layer rich in a solid lubricant on the surface of a substrate for the sliding member without work-hardening the substrate surface.

Molybdenum disulfide, graphite, tungsten disulfide and boron nitride are often used as solid lubricants. They have the form of plate crystal grains and the plate crystal grains have a layer crystal structure formed by piling mainly layers with (00l) planes in terms of Miller indices as the maximum face in parallel. For example, plate crystal grains of molybdenum disulfide have a structure in which as shown in FIG. 7, layers formed by connecting $MoS_2$ molecules in a direction parallel to the xy-plane are piled in the z-axis direction. Only weak van der Waals force is applied between the layer 1 and the layer 2 which are adjacent to each other. As shown in FIG. 6, such solid lubricant plate crystal grains 3 have the outer shape of a relatively thin plate.

When plate crystal grains having a layer crystal structure are present as a solid lubricant in the coating layer of a sliding member and shearing force is applied between layers in the plate crystal grain with the movement of a counter member, the van der Waals force is easily overcome, so that slide occurs between the layers. This interlaminar slide is characteristic of a substance having a layer crystal structure and the coefficient of friction in this case is very small. This is a mechanism by which the sliding member has low frictional properties when the plate crystal grains are used as a solid lubricant.

The present inventor has accomplished the invention by having the following expectation: since a mechanism by which solid lubricant plate crystal grains having a layer crystal structure have low frictional properties is as described above, still lower frictional properties can be attained when each plane between layers in the solid lubricant plate crystal grain constituting a coating layer is parallel to the direction of movement of a counter member, namely, it is parallel to the surface of the coating layer.

According to the present invention, the following sliding members and processes for producing the coating layer of each of the sliding members are provided.

(1) A sliding member comprising a substrate and a coating layer having a sliding surface and adhered to the surface of the substrate, wherein
said coating layer is formed by laminating solid lubricant plate crystal grains and contains not more than 10 mass % of a resin for binder for bonding the solid lubricant plate crystal grains, and
said solid lubricant plate crystal grains have a crystal structure formed by piling (00l) planes (wherein l is an integer of not less than 1) in parallel, the index of orientation of the (00l) planes being not less than 90% at least on said sliding surface.

(2) A sliding member according to (1), wherein said solid lubricant plate crystal grains are composed of not less than one compound selected from molybdenum disulfide, graphite, tungsten disulfide, boron nitride and molybdenum trioxide.

(3) A sliding member according to (1) or (2), wherein said resin for binder is contained in said coating layer in a proportion of 2 to 7 mass %.

(4) A sliding member according to any one of (1) to (3), wherein said resin for binder is composed of a thermoplastic resin or a thermosetting resin.

(5) A process for forming the coating layer of a sliding member according to any one of (1) to (4), which comprises
subjecting the solid lubricant plate crystal grains having a crystal structure formed by piling (00l) planes in parallel, to free adhesion to adhesion media together with powder of the resin for binder,
sliding the adhesion media having the solid lubricant plate crystal grains and the powder of the resin for binder subjected to the free adhesion to the adhesion media, on the surface of the substrate while applying a pressure to the substrate surface, to adhere the solid lubricant plate crystal grains to the substrate surface with rubbing, together with the powder of the resin for binder so that the (00l) planes of the solid lubricant plate crystal grains may be parallel to the substrate surface, sliding the above-mentioned adhesion media on the surfaces of the solid lubricant plate crystal grains adhered to the substrate surface, under pressure to adhere the solid lubricant plate crystal grains adhered freely to the adhesion media, to the surfaces of the solid lubricant plate crystal grains adhered to the substrate surface, together with the powder of the resin for binder to effect laminating, and infiltrating the powder of the resin for binder into the spaces among the above-mentioned solid lubricant plate crystal grains by allowing the powder to assume a semi-molten state or a molten state by heating the substrate and/or generating frictional heat by adjustment of the sliding speed of the adhesion media, at the time of the adhesion of the above-mentioned solid lubricant plate crystal grains and the powder of the resin for binder.

(6) A process for forming the coating layer of a sliding member according to (5), wherein the powder of said resin for binder is composed of powder of a thermosetting resin, and said resin for binder is infiltrated into the spaces among the above-mentioned solid lubricant plate crystal grains and then heated to be cured.

BRIEF DESCRIPTION OF THE DRAWINGS

FIG. 9 is a graph showing the result of an X-ray diffraction intensity test on the coating layer of a specimen of a comparative example.

DESCRIPTION OF REFERENCE NUMERALS

Figure 1:
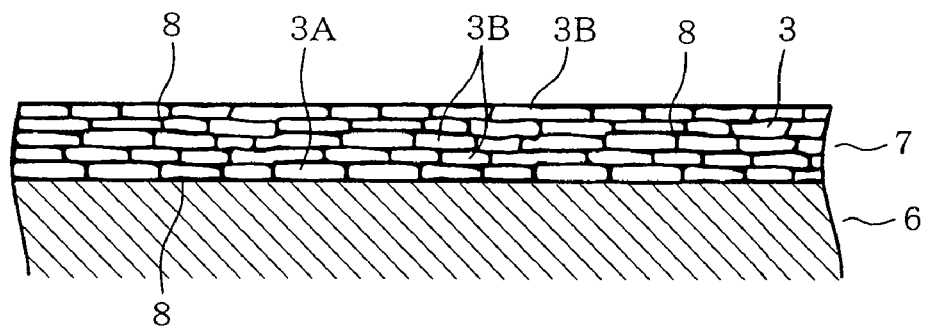
FIG. 1 is a schematic cross-sectional view showing the laminar structure of solid lubricant plate crystal grains in a coating layer.

In the drawings, numeral 4 denotes a plain bearing (a sliding member), numeral 5 a backing metal layer, numeral 6 a bearing alloy layer (a substrate), numeral 7 a coating layer, numeral 8 a resin for binder, numeral 10 an adhering apparatus, and numeral 13 an adhesion medium.

DETAILED DESCRIPTION OF THE INVENTION

1. Sliding Member of the Invention
<Prerequisite Constitution of the Invention>

The present invention is directed to a sliding member having a structure formed by adhering a coating layer having a sliding surface to the surface of a substrate.

Figure 2:
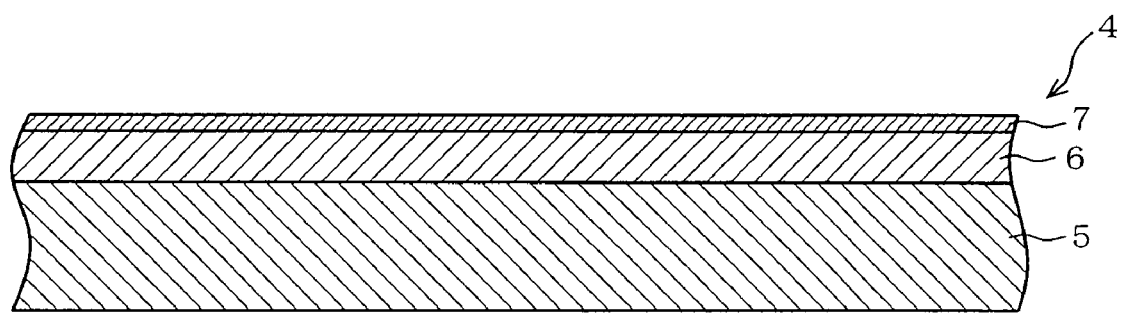
FIG. 2 is a partially sectional view of a plain bearing.
Figure 4:
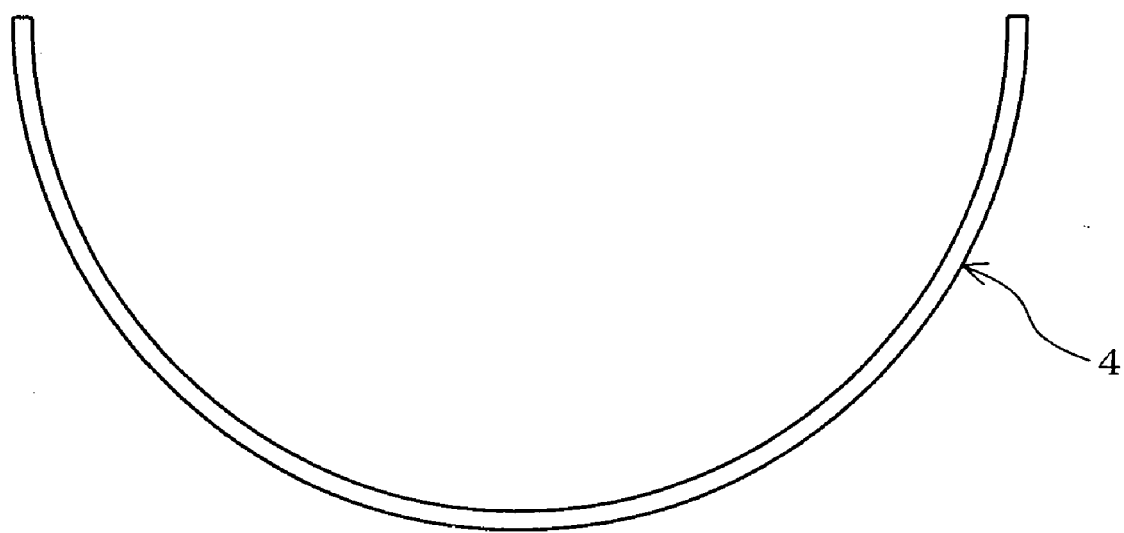
FIG. 4 is a side view of a plain bearing.
Figure 5:
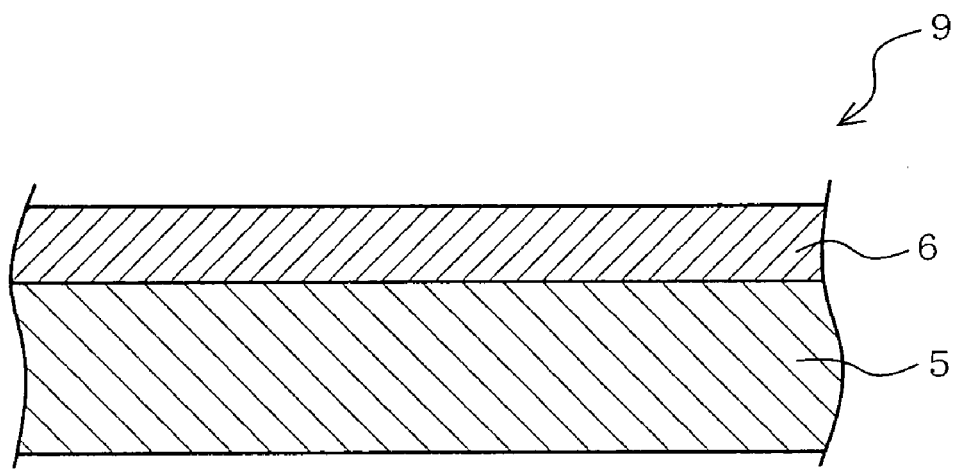
FIG. 5 is a cross-sectional view of a bimetal.
Figure 6:
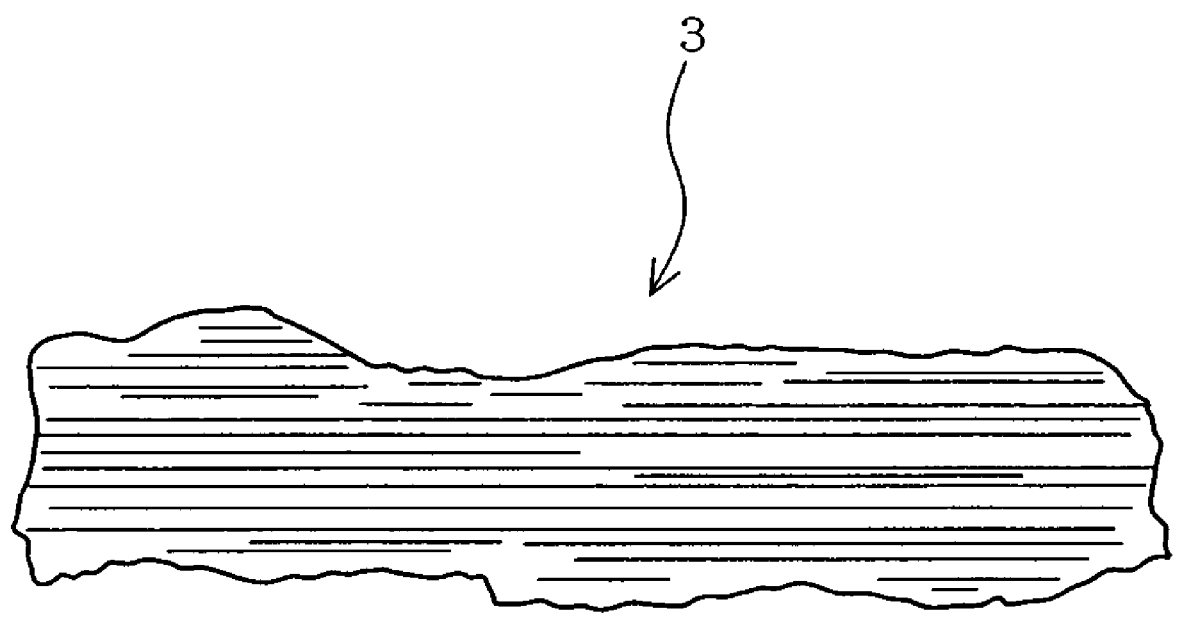
FIG. 6 is a schematic illustration showing the laminated state of plate crystals of solid lubricant plate crystal grains.
Figure 7:
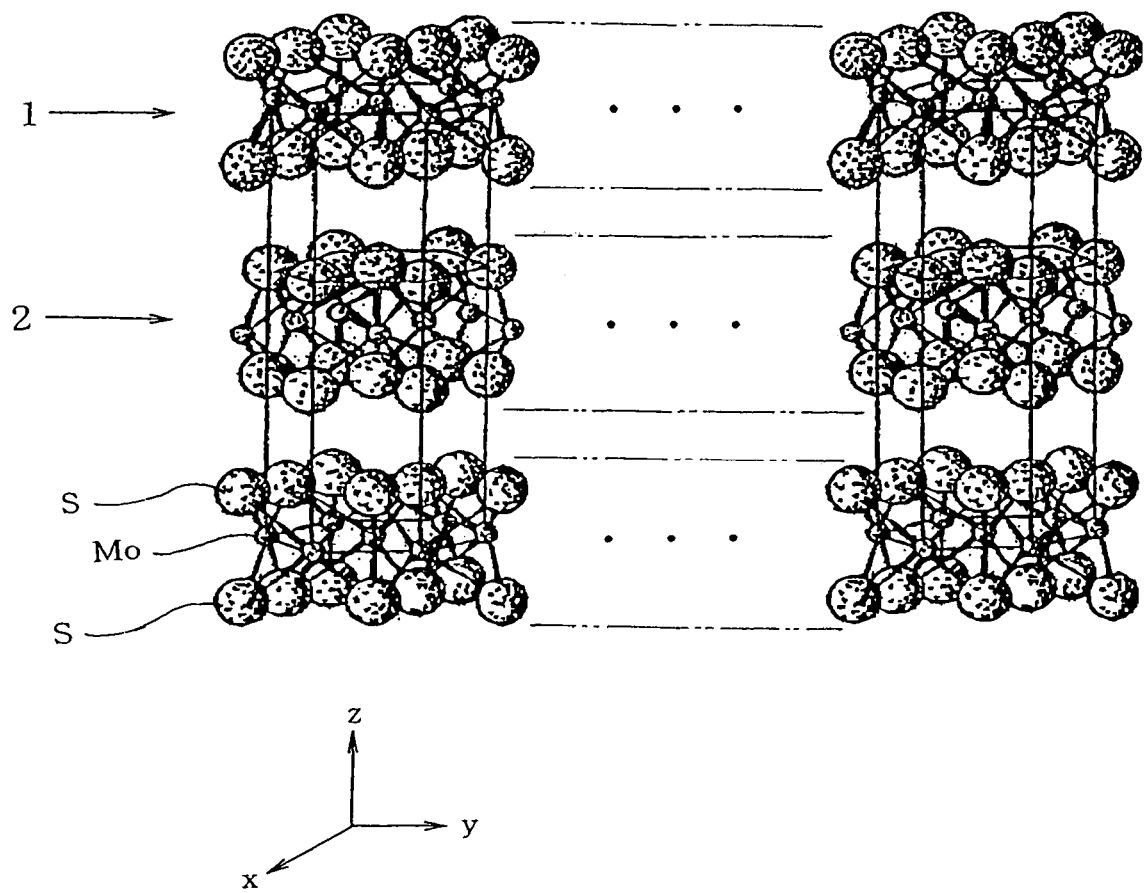
FIG. 7 is a diagram showing the crystal structure of molybdenum disulfide.

FIG. 2 is a partially sectional view of a sliding member for radial bearing (a plain bearing) 4 as an example of sliding member. This sliding member for radial bearing 4 has, for example, a three-layer structure composed of a backing metal layer 5, a bearing alloy layer 6 formed as lining material on the backing metal layer 5, and a coating layer 7 formed on the bearing alloy layer 6 as substrate. The sliding member for radial bearing 4 is formed in a semicylindrical shape as shown in FIG. 4 or a cylindrical shape not shown. As the structure of the sliding member for radial bearing 4 before the formation of the coating layer, there is often used a two-layer structure obtained by forming the bearing alloy layer 6 on the backing metal layer 5 as shown in FIG. 5, or a multi-layer structure obtained by further forming an overlay layer on the surface of the bearing alloy layer 6. A monolayer structure composed of only the bearing alloy layer is also used. A sliding member used as a thrust bearing is merely in the shape of a flat plate and its structure before the formation of a coating layer is the same as that of the sliding member for radial bearing, namely, the monolayer, two-layer or multi-layer structure. In the case of the monolayer structure and the two-layer structure, the bearing alloy layer corresponds to a substrate. In the case of the multi-layer structure, the overlay layer corresponds to a substrate.

In addition, the present invention can be applied also to a sliding member having no bearing alloy layer, namely, a sliding material composed of only a member corresponding to the backing metal layer 5 in FIG. 5. In this case, the member corresponding to the backing metal layer is used as a substrate. The member corresponding to the backing metal layer is not limited to that made of a metal and may be that made of a resin.

In the sliding member to which the present invention is directed, a coating layer is adhered to the surface of a substrate. Therefore, a counter member slides on the surface of the coating layer. The surface of the coating layer on which the counter member slides is referred to as the sliding surface.

<Characteristic Constitution of the Sliding Member of the Invention>

On the basis of a sliding member with the above-mentioned structure as a premise, the sliding member of the present invention is characterized in that the above-mentioned coating layer is formed by laminating solid lubricant plate crystal grains and contains not more than 10 mass % of a resin for binder for bonding the solid lubricant plate crystal grains, and that said solid lubricant plate crystal grains have a crystal structure formed by piling (00l) planes (wherein l is an integer of not less than 1) in parallel, the index of orientation of the (00l) planes being not less than 90% at least on the above-mentioned sliding surface (the aspect (1) of the invention).

The sliding member of the present invention has not only a low coefficient of friction but also an excellent wear resistance.

In the present invention, the coating layer is formed by laminating solid lubricant plate crystal grains on the surface of a substrate. Therefore, the coating layer can be formed thick by increasing the number of laminated layers of the solid lubricant plate crystal grains. As the solid lubricant plate crystal grains, plate crystal grains of not less than one compound selected from molybdenum disulfide, graphite, tungsten disulfide, boron nitride and molybdenum trioxide can be used (the aspect (2) of the invention). The solid lubricant plate crystal grains of such a compound fall under the hexagonal system.

FIG. 1 shows the laminated state of solid lubricant plate crystal grains 3 on the surface of a substrate, for example, a bearing alloy layer 6. The spaces among the solid lubricant plate crystal grains laminated are filled with a resin for binder 8 and the resin for binder 8 bonds the solid lubricant plate crystal grains 3 to one another. The resin for binder 8 is present also between the solid lubricant plate crystal grains 3 and the bearing alloy layer 6 and adhere the solid lubricant plate crystal grains 3 to the bearing alloy layer 6.

In the present specification, the crystal form of solid lubricant plate crystal grains is expressed in terms of Miller indices (hkl) and the index of orientation of (00l) crystal planes is defined by the following equation. Here, l is an integer of not less than 1.

$$\text{Index of orientation of } (00l) \text{ planes } (\%) = [\Sigma R(00l)/\Sigma R(hkl)] \times 100$$

wherein R(00l) means X-ray intensity on a (00l) plane, ΣR(00l) is the sum of X-ray intensities on (00l) planes detected, and ΣR(hkl) is the sum total of X-ray intensities on (hkl) planes, namely, all planes detected.

The number of crystal planes oriented as (00l) planes increases according as the index of orientation approaches 100%. The solid lubricant plate crystal grains have a layer crystal structure formed by piling layers in the grain so that (00l) planes may be parallel to one another. In the following explanation, the boundary surface between the layers in the plate crystal grain is referred to as an interlaminar surface. The interlaminar surface is parallel to the (00l) planes. In the present invention, the index of orientation of the (00l) planes of the solid lubricant plate crystal grains is not less than 90% at least on the sliding surface. In a coating layer having a large index of orientation of (00l) planes, the number of solid lubricant plate crystal grains whose (00l) planes are piled in parallel with the direction of sliding tends to be large.

As described above, the coating layer has a laminated structure formed by solid lubricant plate crystal grains. The resin for binder is present so as to fill up the spaces among the solid lubricant plate crystal grains. The resin for binder has higher hardness and strength than do the solid lubricant plate crystal grains. Since the resin for binder has elasticity, it is deformed under a load applied by a counter member, so that the sliding surface comes into contact with the counter member on a plane to receive the load.

When the counter member slides on the sliding surface under boundary lubrication, the counter member slides in contact with the solid lubricant plate crystal grains occupying a wide area in the sliding surface. Therefore, shearing force is applied to the solid lubricant plate crystal grains with the movement of the counter member. Owing to this application, slide (interlaminar slide) occurs between layers parallel to the direction of movement of the counter member in the solid lubricant plate crystal grain. In this case, since only very weak van der Waals force is applied between layers of the plate crystal, the interlaminar slide is easily caused by a very weak shearing force. As a result, the counter member encounters only very weak frictional resistance and hence slides smoothly even under boundary lubrication. Furthermore, since a load applied by the counter member is received also by the resin for binder which is hard and has a high strength, the early abrasion of the coating layer (the solid lubricant plate crystal grains) is prevented.

The content of the resin for binder which exhibits the above-mentioned effects is not more than 10 mass %. When the content is more than 10 mass %, a high index of orientation cannot be attained, so that the effect of the low frictional properties of the solid lubricant plate crystal grains cannot be expected. The content is preferably not less than 0.5 mass %. The content of the resin for binder is more preferably 2 to 7 mass % (the aspect (3) of the invention). As the resin for binder, either a thermoplastic resin or a thermosetting resin may be used (the aspect (4) of the invention). Ethylene tetrafluoride-perfluoroalkoxyethylene copolymer resins (PFA), polyamide resins (PA), polyamide-imide resins (PAI) and phenolic resins (PF) are especially preferable.

2. Process for Producing the Sliding Member of the Invention

The coating layer of the sliding member of the present invention is formed by the following process.

That is, in a process for forming the coating layer of the sliding member comprising a substrate and the coating layer having a sliding surface and adhered to the surface of the substrate, solid lubricant plate crystal grains having a crystal structure formed by piling (00l) planes in parallel are subjected to free adhesion to adhesion media together with powder of a resin for binder; the adhesion media having the solid lubricant plate crystal grains and the powder of the resin for binder subjected to the free adhesion to the adhesion media are slid on the surface of the substrate while applying a pressure to the substrate surface, to adhere the solid lubricant plate crystal grains to the substrate surface with rubbing, together with the powder of the resin for binder so that the (00l) planes of the solid lubricant plate crystal grains may be parallel to the substrate surface; the above-mentioned adhesion media are slid on the surfaces of the solid lubricant plate crystal grains adhered to the substrate surface, under pressure to adhere the solid lubricant plate crystal grains adhered to the adhesion media, to the surfaces of the solid lubricant plate crystal grains adhered to the substrate surface, together with the powder of the resin for binder to effect laminating; and the powder of the resin for binder is infiltrated into the spaces among the above-mentioned solid lubricant plate crystal grains by allowing the powder to assume a semi-molten state or a molten state by heating the substrate and/or generating frictional heat by adjustment of the sliding speed of the adhesion media, at the time of the adhesion of the above-mentioned solid lubricant plate crystal grains and the powder for the resin for binder.

The process for forming the coating layer of the sliding member of the present invention makes it possible to form a coating layer rich in the solid lubricant on the surface of the substrate for the sliding member without work-hardening the substrate surface.

According to this formation process, when the adhesion media having the solid lubricant plate crystal grains and the powder of the resin for binder subjected to the free adhesion to the adhesion media are slid on the surface of the substrate under pressure, the solid lubricant plate crystal grains roll on the substrate surface while rubbing the substrate surface. In this case, since the solid lubricant plate crystal grains are like plates as described above, they move while lining up. They line up so that their (00l) planes may be oriented in parallel with the substrate surface to which the strongest frictional force is applied. Since a chemical reaction place is formed by the friction of the solid lubricant plate crystal grains against the substrate surface, a tribochemical reaction occurs, so that the solid lubricant plate crystal grains are bonded to the substrate surface by a force stronger than van der Waals force bonding layers in the solid lubricant plate crystal grains to one another. The powder of the resin for binder intrudes into the spaces among the solid lubricant plate crystal grains adhered to the substrate surface, to be held among them.

Furthermore, the solid lubricant plate crystal grains adhered to the media are successively laminated on the solid lubricant plate crystal grains adhered to the substrate surface. Simultaneously with this laminating, the powder of the resin for binder intrudes into the spaces among the laminated solid lubricant plate crystal grains to be held among them. FIG. 1 shows a state in which a plurality of layers of solid lubricant plate crystal grains 3B are adhered to the surfaces of solid lubricant plate crystal grains 3A adhered as the first layer to the surface of a bearing alloy layer 6.

During such adhesion of solid lubricant plate crystal grains, the powder of the resin for binder is infiltrated into the spaces among the solid lubricant plate crystal grains by allowing the powder to assume a semi-molten state or a molten state by heating the substrate and/or generating frictional heat by adjustment of the sliding speed of the adhesion media. Owing to this infiltration, the solid lubricant plate crystal grains are fixed to the substrate surface and at the same time, the solid lubricant plate crystal grains are bonded to one another.

When the resin for binder is a thermosetting resin, its bonding power can be increased by heating the resin for binder to cause crosslinking reaction (curing treatment) after the infiltration of the resin for binder into the spaces among the solid lubricant plate crystal grains. When the resin for binder is a thermoplastic resin, it is solidified by cooling.

Figure 8A:
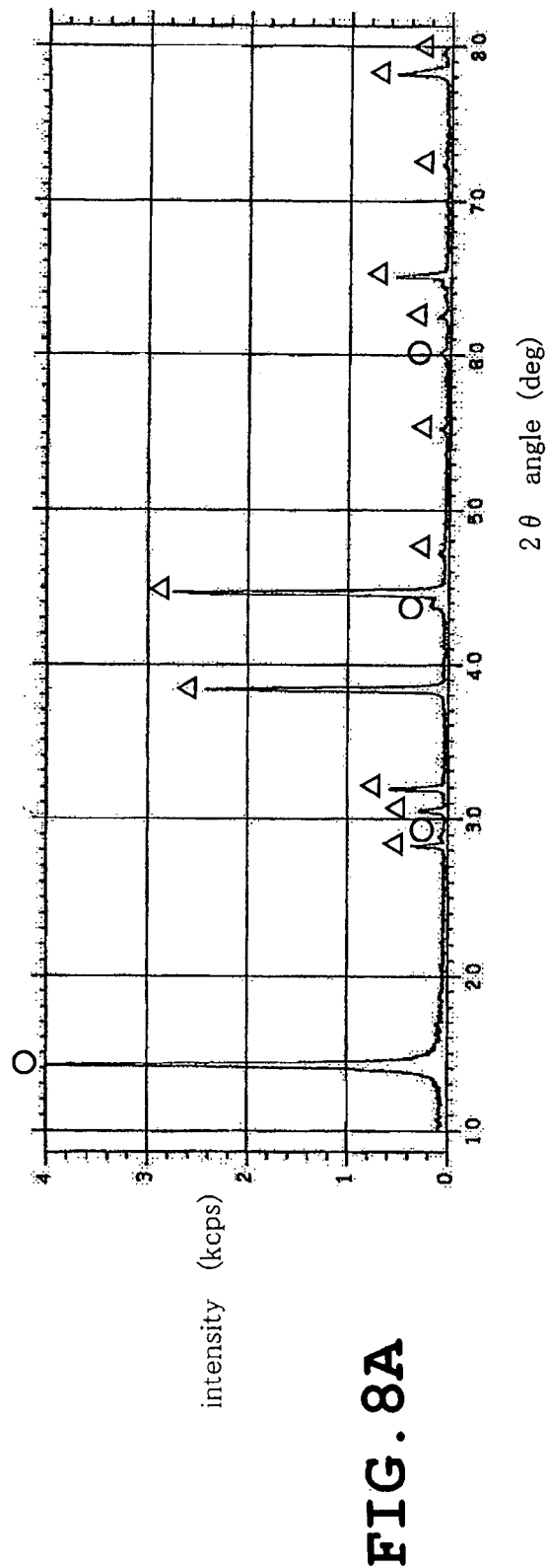
FIG. 8 is a graph showing the result of an X-ray diffraction intensity test on the coating layer of a specimen of a working example.
Figure 8B:
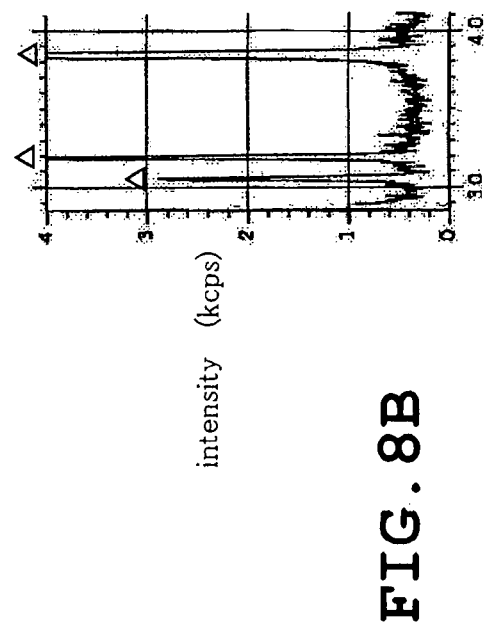

In the case of the coating layer formed by the formation process of the present invention, peaks other than peaks due to (00l) crystal planes such as (002) plane and (004) plane are hardly observed as to the orientation of solid lubricant plate crystal grains in the sliding surface of the coating layer (FIG. 8). On the other hand, in the case of the sliding surface of a coating layer formed by a formation process different from the process of the present invention, peaks due to crystal planes other than (00l) planes, such as (101) plane, (102) plane and (103) plane are also detected (FIG. 9). These facts are described hereinafter.

DESCRIPTION OF PREFERRED EMBODIMENTS

An embodiment in which the present invention is applied to a sliding member for radial bearing (hereinafter referred to merely as a plain bearing) is explained below with reference to the drawings. As shown in FIG. 4, a plain bearing 4 is formed in a semicylindrical shape. The plain bearing 4 has a multi-layer structure composed of a backing metal layer 5, a bearing alloy layer 6 and a coating layer 7 as shown in FIG. 2.

The solid lubricant plate crystal grains that constitute the coating layer are soft in themselves and hence have an excellent embeddability, a satisfactory conformability and an excellent anti-seizure property.

Because of these facts, in the case of the sliding member of this embodiment, a counter member slides smoothly with slight friction owing to the solid lubricant plate crystal grains while the early abrasion of the coating layer is prevented by the resin for binder. Therefore, the sliding member is excellent in both wear resistance and anti-seizure property. A process for producing the plain bearing 4 is as follows. As shown in FIG. 5, a bimetal 9 is formed at first by lining the backing metal layer 5 with the bearing alloy layer 6. Then, a strip is cut out of the bimetal 9 and bent in a semicylindrical shape to obtain a semicylindrical shaped product. The surface of the bearing alloy layer 6 as the inner peripheral surface of the semicylindrical shaped product is finished by boring and then washed to be degreased, and the coating layer 7 is formed on the bearing alloy layer 7 to obtain the plain bearing 4.

The coating layer 7 comprises solid lubricant plate crystal grains 3 laminated on the surface of the bearing alloy layer 6 and as shown in FIG. 1, the coating layer 7 contains a resin for binder 8 for bonding the solid lubricant plate crystal grains 3 to the bearing alloy layer 6 and bonding the solid lubricant plate crystal grains 3 to one another.

Figure 3:
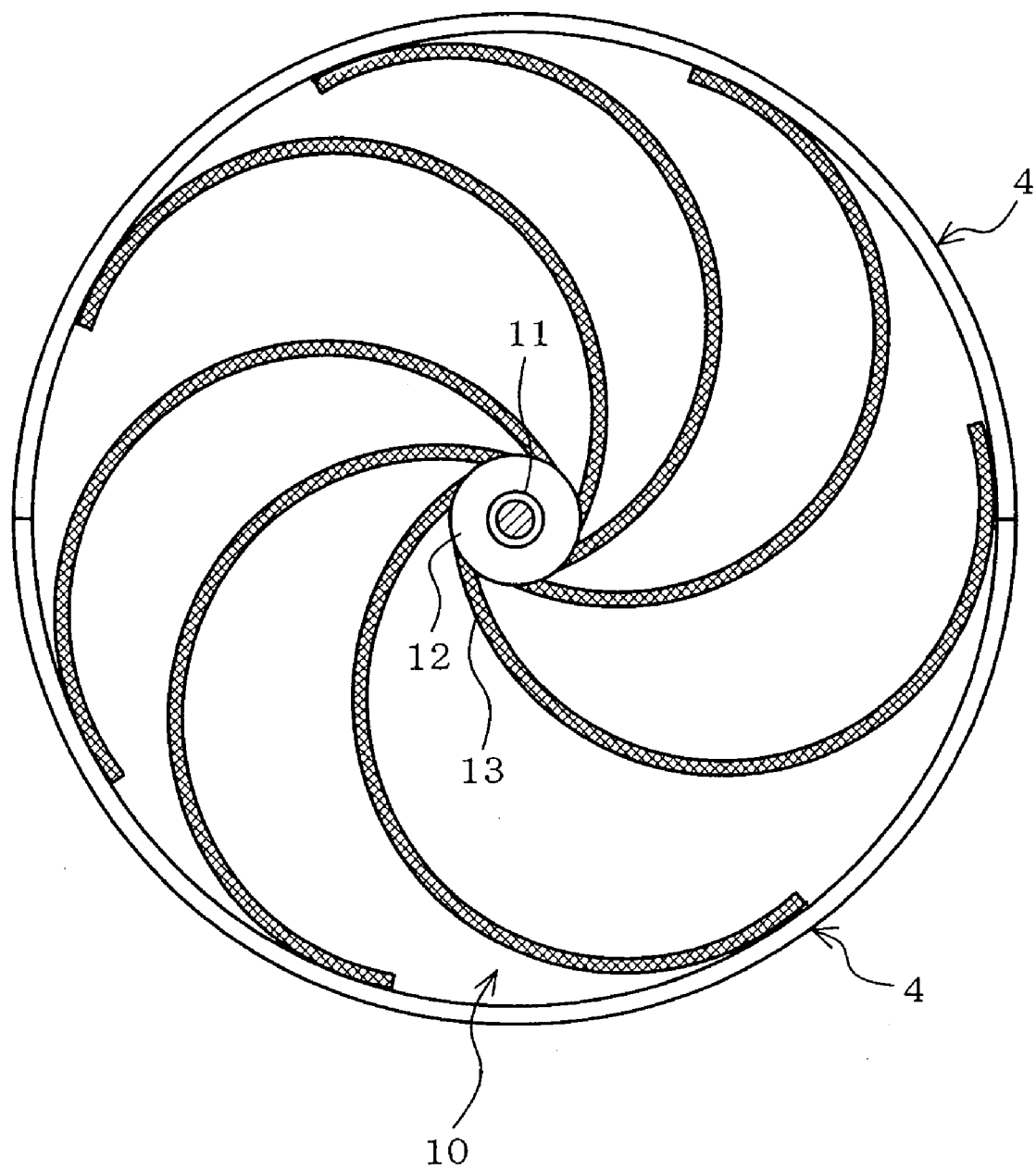
FIG. 3 is a cross-sectional view of an adhering apparatus.

As shown in FIG. 3, an adhering apparatus 10 for laminating the solid lubricant plate crystal grains 3 on the surface of the bearing alloy layer 6 is constructed by fixing one end of each of not less than two adhesion media 13 to a rotator 12 attached as a core to a rotating shaft 11 so as to be detachable.

Each adhesion medium 13 is composed of a flexible member of cloth, nonwoven fabric, paper, leather, plastics, fibrous metal or the like, and here, it is formed in a circular arc shape having a width somewhat larger than that of the plain bearing 4. The adhesion medium 13 is preferably a member having a large surface area owing to its uneven surface or the like. This is because such a member makes it possible to subject large amounts of the solid lubricant plate crystal grains and powder of the resin for binder to free adhesion to the adhesion media 13 all at once.

In order to form the coating layer 7 on the inner peripheral surface of the plain bearing 4 with the adhering apparatus 10, two plain bearings 4 are combined at first in the form of a cylinder and fixed to a jig (not shown) so as to have the same center as that of the rotating shaft 11. Large amounts of the solid lubricant plate crystal grains having a layer crystal structure formed by piling (00l) planes in parallel, for example, molybdenum disulfide grains and the powder of the resin for binder, for example, powder of a phenolic resin are subjected to free adhesion to the not less than two adhesion media 13 fixed to the rotator 12, and the rotator 12 is attached to the rotating shaft 11 so that these adhesion media 13 may be accommodated in the two plain bearings 4 combined in the form of a cylinder.

The rotating shaft 11 is rotated with a motor not shown. Owing to this rotation, the other end of each adhesion medium 13 receives centrifugal force due to the rotation and hence rotates glidingly while applying a pressure to the inner peripheral surface of the bearing alloy layer 6, i.e., the inner peripheral surface of the plain bearing 4. In this case, the sliding speed of the adhesion medium 13 on the above-mentioned inner peripheral surface is preferably not less than 5 m/sec. Owing to the rotation of the adhesion media 13, the molybdenum disulfide grains and phenolic resin powder subjected to free adhesion to the adhesion media 13 move with rubbing under pressure applied by the adhesion media 13 and the above-mentioned inner peripheral surface, whereby the molybdenum disulfide grains are oriented so that their interlaminar surfaces may be parallel to the surface of the bearing alloy layer 6 (because the (00l) planes, i.e., the maximum planes are stable when they are parallel to the above-mentioned direction of movement), and they cause a tribochemical reaction to adhere to the surface of the bearing alloy layer 6. In this case, the phenolic resin powder is infiltrated into the spaces among the solid lubricant plate crystal grains adhering to the bearing alloy layer 6.

In addition, owing to the rotation of the adhesion media 13, on the molybdenum disulfide grains adhering to the surface of the bearing alloy layer 6 are successively laminated other molybdenum disulfide grains while being oriented so that their (00l) planes (interlaminar surfaces) may be substantially parallel to the (00l) planes of the lower molybdenum disulfide grains. Also in this case, the phenolic resin powder is infiltrated into the spaces among the laminated solid lubricant plate crystal grains.

Thus, the coating layer 7 composed of layers formed by laminating molybdenum disulfide grains is formed on the bearing alloy layer 6. The adhesion procedure described above is finished when the thickness of the coating layer 7 becomes a desired thickness of not less than 1 μm. The time of carrying out the adhesion procedure is properly determined depending on the desired thickness of the coating layer 7.

In the formation of the coating layer 7, a jig not shown is preheated to heat the plain bearing 4 fixed to the jig, or the degree of the generation of frictional heat is controlled by properly controlling the sliding speed of the adhesion media 13 on the surface of the plain bearing 4, whereby the phenolic resin powder is allowed to assume a semi-molten state or a molten state to obtain fluidity. As a result, the phenolic resin infiltrated into the space between the bearing alloy layer 6 and the solid lubricant plate crystal grains on this layer and the spaces among the solid lubricant plate crystal grains fill up the spaces. Then, the phenolic resin is subjected to crosslinking reaction by heating the plain bearing 4 to a predetermined temperature. By this reaction, the phenolic resin as thermosetting resin is cured to adhere the solid lubricant plate crystal grains to the bearing alloy layer 6 and bond the solid lubricant plate crystal grains strongly to one another.

When the resin for binder is a thermoplastic resin, powder of the resin for binder is allowed to assume a semi-molten state or a molten state by heating and then solidified, for example, by water-cooling the jig.

EXAMPLES

Working examples of the present invention are explained below. A bimetal was produced by lining a backing metal layer with an aluminum-based bearing alloy layer (e.g. Al-12 mass % Sn-3 mass % Si-1 mass % Cu). A strip was obtained from the bimetal and bent in the form of a semicylinder, after which the surface of the bearing alloy layer was finished by boring, whereby specimens of examples 1 to 5 and specimens of comparative examples 1 to 4 were produced. For each of the specimens of examples 1 to 5 and the specimens of comparative example 1, a coating layer of about 8 μm in thickness was formed in the manner described above by laminating the solid lubricant plate crystal grains listed in the following Table 1 together with powder of the resin for binder listed in Table 1 with the adhering apparatus 10 shown in FIG. 3.

For the specimen of comparative example 2, a coating layer of about 0.1 μm in thickness was formed by allowing solid lubricant plate crystal grains (molybdenum disulfide) to collide with the bearing alloy layer with a shot blasting apparatus. When a shot blasting method is adopted, the coating layer cannot be formed in a sufficient thickness and powder of a resin for binder having a specific gravity different from that of the solid lubricant plate crystal grains cannot be blasted at the same time. Therefore, no resin for binder was present in the coating layer.

For the specimen of comparative example 3, a coating layer of about 8 μm in thickness was formed by laminating only the solid lubricant plate crystal grains listed in Table 1 (graphite) with the adhering apparatus shown in FIG. 3.

For the specimen of comparative example 4, no coating layer was formed, namely, the surface of the bearing alloy layer was the sliding surface that came into contact with a counter member.

TABLE 1

|  | Kind of solid lubricant plate crystal grains | Kind of resin added | Amount of resin added (mass %) | Remaining amount 4 hours after the start of test (μm) | Coefficient of friction 4 hours after the start of test | Index of orientation (%) |
|---|---|---|---|---|---|---|
| Specimen of example 1 | Molybdenum disulfide | PFA | 1 | 2.9 | 0.079 | 99 |
| Specimen of example 2 | Graphite | PAI | 3 | 2.8 | 0.081 | 97 |
| Specimen of example 3 | Molybdenum disulfide | PFA | 5 | 3.5 | 0.077 | 98 |
| Specimen of example 4 | Graphite | PFA | 7 | 3.7 | 0.078 | 94 |
| Specimen of example 5 | Molybdenum disulfide | PF | 9 | 3.0 | 0.084 | 93 |
| Specimen of comparative example 1 | Graphite | PF | 11 | 2.9 | 0.101 | 88 |
| Specimen of comparative example 2 | Molybdenum disulfide | — | — | 0 | 0.122 | 88 |
| Specimen of comparative example 3 | Graphite | — | 0 | 2.0 | 0.081 | 97 |
| Specimen of comparative example 4 | — | — | — | — | 0.135 | — |

For the above-mentioned specimens of examples 1 to 5 and specimens of comparative examples 1 to 3, the index of orientation of the (00l) planes of solid lubricant plate crystal grains in the surface of the coating layer was determined by an X-ray diffraction intensity test. For the specimens of examples 1 to 5 and the specimens of comparative examples 1 to 4, a wear test was carried out to measure the remaining amount of the coating layer (the thickness of the coating layer remaining after abrasion) and the coefficient of friction 4 hours after the start of the test. Table 1 shows the index of orientation, the remaining amount and the coefficient of friction which were measured. The wear test was carried out by the use of a frictional wear tester. The following Table 2 shows the wear test conditions.

TABLE 2

| Item | Conditions |
|---|---|
| Bearing bore | 53 mm |
| Bearing width | 16 mm |
| Peripheral speed | 10 m/sec. |
| Test load | 50 MPa |
| Test time | 4 hours |
| Lubricating oil | VG22 |

TABLE 2-continued

| Item | | Conditions |
|---|---|---|
| Counter member | Material | Hardened steel |
| | Hardness | 500~600 Hv |
| | Roughness | 0.3 μm(Rz) |

Examples of measurement result obtained by the X-ray diffraction intensity test on the specimens of the examples and the specimens of the comparative examples are shown in FIGS. 8 (*a*) and (*b*) and FIGS. 9 (*a*) and (*b*), respectively. FIG. 8 shows the measurement result for the specimen of example 1 and FIG. 8 (*b*) is a partly enlarged view of FIG. 8 (*a*). FIG. 9 shows the measurement result for the specimen of comparative example 2 and FIG. 9 (*b*) is a partly enlarged view of FIG. 9 (*a*). In FIGS. 8 (*a*) and (*b*) and FIGS. 9 (*a*) and (*b*), O (open circle) indicates the (00l) planes of molybdenum disulfide as solid lubricant plate crystal grains, Δ (triangle) indicates the crystal planes of the bearing alloy layer, and × (cross) indicates the crystal planes other than (00l) planes of molybdenum disulfide.

As is clear from FIGS. 8 (*a*) and (*b*), almost no peak due to the crystal planes other than (00l) planes of solid lubricant plate crystal grains is observed in the measurement result for the specimen of example 1. On the other hand, as is clear from FIGS. 9 (*a*) and (*b*), peaks due to the crystal planes other than (00l) planes of solid lubricant plate crystal grains are easily observed in the measurement result for the specimen of comparative example 2. As shown in FIG. 9 (*b*), (101), (102) and (103) planes, i.e., crystal planes other than (00l) planes were identified in the case of the measurement result for the specimen of comparative example 2.

In the case of the specimen of comparative example 1, the index of orientation was less than 90%. The reason is considered as follows: since the amount of the resin for binder is more than 10 mass %, the orientation of solid lubricant plate crystal grains is hindered by the resin for binder because of the large amount of the resin for binder during the formation of the coating layer. In the coating layer formed by shot peening in the case of the specimen of comparative example 2, the index of orientation of solid lubricant plate crystal grains was less than 90%. This is because it is difficult to make the orientation of solid lubricant plate crystal grains uniform.

The result of the wear test is considered below. At first, in the case of the specimens of examples 1 to 5, the amount of wear is smaller than in the case of the specimen of comparative example 3 having the coating layer formed by the same process as in the case of the specimens of examples 1 to 5. The reason is considered as follows: the coating layer of each of the specimens of examples 1 to 5 has an improved strength and a high wear resistance because it contains the resin for binder. The remaining amount of the coating layer of the specimen of comparative example 2 is zero because it was completely worn away.

Next, as to the coefficient of friction, the specimen of comparative example 4 has a high coefficient of friction. It is considered that since the specimen of comparative example 4 has no coating layer, sliding of an associated shaft and the bearing alloy layer of the specimen on each other, i.e., direct metal contact was often caused, resulting in the high coefficient of friction.

Of the specimens having a coating layer, the specimens of examples 1 to 5 have a lower coefficient of friction than the specimens of comparative examples 1 to 3. Since this coefficient of friction is that measured 4 hours-after the start of the wear test, it is also clear that the specimens of examples 1 to 5 continue to cause only slight friction for a long period of time. It is considered that the low coefficient of friction of the specimens of examples 1 to 5 is due to the index of orientation of the solid lubricant plate crystal grains of not less than 90% and that the lubricating ability of the solid lubricant plate crystal grains is sufficiently exhibited.

Furthermore, the coefficient of friction of the specimens of examples 1 to 5 is equal to that of the specimen of comparative example 3 having a coating layer formed by the same process without using any resin for binder. This fact is considered as follows: the addition of the resin for binder in a proportion of not more than 10 mass % has no undesirable influence on the lubricating ability of the solid lubricant plate crystal grains and moreover, the resin for binder bonds the solid lubricant plate crystal grains to one another to maintain the low coefficient of friction for a long period of time. The amount of the resin for binder added is adjusted to not more than 10 mass % because in the case of the specimen of comparative example 1 having an amount of the resin for binder of as large as 11 mass %, the index of orientation is as small as less than 90%, so that the coefficient of friction is high.

The invention claimed is:

1. A sliding member comprising a substrate and a coating layer having a sliding surface and adhered to the surface of the substrate, wherein
said coating layer is formed by laminating solid lubricant plate crystal grains and contains not more than 10 mass % of a resin for binder for bonding the solid lubricant plate crystal grains, and
said solid lubricant plate crystal grains have a crystal structure formed by piling (00l) planes (wherein l is an integer of not less than 1) in parallel, the index of orientation of the (00l) planes being not less than 90% at least on said sliding surface.

2. A sliding member according to claim 1, wherein said solid lubricant plate crystal grains are composed of not less than one compound selected from molybdenum disulfide, graphite, tungsten disulfide, boron nitride and molybdenum trioxide.

3. A sliding member according to claim 1, wherein said resin for binder is contained in said coating layer in a proportion of 2 to 7 mass %.

4. A sliding member according to claim 1, wherein said resin for binder is composed of a thermoplastic resin or a thermosetting resin.

5. A process for forming the coating layer of a sliding member according to claim 1, which comprises
subjecting the solid lubricant plate crystal grains having a crystal structure formed by piling (00l) planes in parallel, to free adhesion to adhesion media together with powder of the resin for binder,
sliding the adhesion media having the solid lubricant plate crystal grains and the powder of the resin for binder subjected to the free adhesion to the adhesion media, on the surface of the substrate while applying a pressure to the substrate surface, to adhere the solid lubricant plate crystal grains to the substrate surface with rubbing, together with the powder of the resin for binder so that the (00l) planes of the solid lubricant plate crystal grains may be parallel to the substrate surface,
sliding the above-mentioned adhesion media on the surfaces of the solid lubricant plate crystal grains adhered to the substrate surface, under pressure to adhere the solid lubricant plate crystal grains adhered freely to the adhesion media, to the surfaces of the solid lubricant plate crystal grains adhered to the substrate surface, together with the powder of the resin for binder to effect laminating, and infiltrating the powder of the resin for binder into the spaces among the above-mentioned solid lubricant plate crystal grains by allowing the powder to assume a semi-molten state or a molten state by heating the substrate and/or generating frictional heat by adjustment of the sliding speed of the adhesion media, at the time of the adhesion of the above-mentioned solid lubricant plate crystal grains and the powder of the resin for binder.

6. A process for forming the coating layer of a sliding member according to claim 5, wherein the powder of said resin for binder is composed of powder of a thermosetting resin, and said resin for binder is infiltrated into the spaces among the above-mentioned solid lubricant plate crystal grains and then heated to be cured.

* * * * *